(12) United States Patent
Liang et al.

(10) Patent No.: US 10,550,314 B2
(45) Date of Patent: Feb. 4, 2020

(54) HIGH TEMPERATURE FRACTURING FLUIDS WITH NANOPARTICLES

(71) Applicant: Saudi Arabian Oil Company, Dhahran (SA)

(72) Inventors: Feng Liang, Cypress, TX (US); Ghaithan Al-Muntasheri, Houston, TX (US); Leiming Li, Sugar Land, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 15/157,999

(22) Filed: May 18, 2016

(65) Prior Publication Data

US 2017/0037302 A1 Feb. 9, 2017

Related U.S. Application Data

(60) Provisional application No. 62/200,807, filed on Aug. 4, 2015.

(51) Int. Cl.
*C09K 8/62* (2006.01)
*C09K 8/68* (2006.01)
*C09K 8/88* (2006.01)

(52) U.S. Cl.
CPC .............. *C09K 8/685* (2013.01); *C09K 8/882* (2013.01); *C09K 8/887* (2013.01); *C09K 2208/24* (2013.01); *C09K 2208/26* (2013.01)

(58) Field of Classification Search
CPC ............ C09K 2208/10; C09K 2208/24; C09K 2208/26; C09K 8/605; C09K 8/805; C09K 2208/12; C09K 2208/20; C09K 2208/32; C09K 8/524; C09K 8/528; C09K 8/602; C09K 8/685; C09K 8/70; C09K 8/882; C09K 8/885; C09K 8/887; C09K 8/92; C09K 8/62; E21B 43/088; E21B 43/247; E21B 43/267; E21B 47/1015

See application file for complete search history.

(56) References Cited

U.S. PATENT DOCUMENTS

| | | | |
|---|---|---|---|
| 3,921,733 A * | 11/1975 | Clampitt | C09K 8/24 166/270 |
| 5,591,700 A | 1/1997 | Harris et al. | |
| 7,644,764 B2 | 1/2010 | Berkland et al. | |
| 2009/0095535 A1 * | 4/2009 | Nguyen | C09K 8/12 175/72 |
| 2012/0015852 A1 * | 1/2012 | Quintero | C09K 8/032 507/112 |
| 2012/0245060 A1 * | 9/2012 | Jiang | C09K 8/512 507/215 |
| 2014/0096964 A1 | 4/2014 | Chakraborty et al. | |
| 2014/0374095 A1 * | 12/2014 | Ladva | C09K 8/80 166/280.2 |
| 2015/0057196 A1 | 2/2015 | Debord et al. | |
| 2015/0284625 A1 | 10/2015 | Silveira et al. | |
| 2018/0155602 A1 * | 6/2018 | Zhang | C09K 8/04 |

FOREIGN PATENT DOCUMENTS

| | | | |
|---|---|---|---|
| CN | 104109525 A | | 10/2014 |
| EP | 2848666 | * | 3/2015 |
| EP | 2848666 A1 | | 3/2015 |
| WO | 2011063023 A2 | | 5/2011 |
| WO | 2012122505 A2 | | 9/2012 |
| WO | WO2012/122505 | * | 9/2012 |
| WO | 2013052359 A1 | | 4/2013 |

OTHER PUBLICATIONS

Barati et al., "A Review of Fracturing Fluid Systems Used for Hydraulic Fracturing of Oil and Gas Wells", Jounral of Applied Polymer Science, 2014, 1-11, 40735, Wiley Periodicals, Inc.
Bayat et al., "Impact of Metal Oxide Nanoparticles on Enhanced Oil Recovery from Limestone Media at Several Temperatures", Energy Fuel, 2014, 6255-6266, 28, American Chemical Society.
Cordova et al., "Delayed HPAM Gelation via Transient Sequestration of Chromium in Polyelectrolyte Complex Nanoparticles", Macromolecules, 2008, 4398-4404, 41, American Chemical Society.
Funkhouser et al., "Hydraulic Fracturing Under Extreme HPHT Conditions: Successful Application of a New Synthetic Fluid in South Texas Gas Wells", SPE Deep Gas Conference and Exhibition, Jan. 24-26, 2010, Society of Petroleum Engineers.
Hendraningrat et al., "Metal Oxide-Based Nanoparticles: Revealing Their Potential to Enhance Oil Recovery in Different Wettability Systems", Appl. Nanosci., 2015, 5:181-199, The Author(s) 2014.
Hurnaus et al., "Crosslinking of Guar and HPG Based Fracturing Fluids Using ZrO2 Nanoparticles", SPE International Symposium on Oilfield Chemistry, Apr. 13-15, 2015, Society of Petroleum Engineers.
Kango et al., "Surface Modification of Inorganic Nanoparticles for Development of Organic-Inorganic Nanocomposites—A Review", Progress in Polymer Science, 2013, 1232-1261, 38, Elsevier Ltd.
Sarkar et al., "Polymer-Supported Metals and Metal Oxide Nanoparticles: Synthesis, Characterization, and Applications", J. Nanopart. Res., 2012, 14:715, Spring Science+Business Media B.V.
International Search Report and Written Opinion dated Sep. 29, 2016 pertaining to International Patent Application No. PCT/US2016/043321.
Examination Report dated Nov. 14, 2018 pertaining to GCC Patent Application No. 2016-31804.
European Official Action dated Mar. 14, 2019 pertaining to EP Application No. 16 745 354.7, 5 pgs.
European Office Action pertaining to European Patent Application No. 16745354.7 dated Sep. 13, 2019.

* cited by examiner

Primary Examiner — Kumar R Bhushan
(74) Attorney, Agent, or Firm — Dinsmore & Shohl

(57) ABSTRACT

Embodiments for a high temperature fracturing fluid comprise an aqueous fluid, carboxyl-containing synthetic polymer, metal oxide nanoparticles having a particle size of 0.1 to 500 nanometers, and a metal crosslinker which crosslinks the carboxyl-containing synthetic polymers to form a crosslinked gel, wherein the metal oxide nanoparticles are dispersed within the crosslinked gel.

22 Claims, 10 Drawing Sheets

HIGH TEMPERATURE FRACTURING FLUIDS WITH NANOPARTICLES

CROSS-REFERENCE TO RELATED APPLICATIONS

This application claims priority to U.S. Provisional Patent Application No. 62/200,807 filed Aug. 4, 2015, which is incorporated by reference herein in its entirety.

TECHNICAL FIELD

Embodiments of the present disclosure generally relate to fracturing fluids, and more specifically relate to fracturing fluids comprising metal oxide nanoparticles.

BACKGROUND

Considerable attention has been devoted to extracting the gas locked within tight subterranean gas formations with permeability in the nano-darcy to micro-darcy range; however, these tight subterranean gas formations are characterized by high temperatures and high pressures. For example, these formations are subject to temperatures around 300 to 400° F. Traditional hydraulic fracturing fluids may utilize crosslinked polysaccharide gels, such as guar and guar derivatives, to transport proppant from the surface to the desired treatment zone; however, the guar and guar derivatives are unstable at these higher temperatures.

Thermally stable synthetic polymers, such as polyacrylamide, may be used in fracturing fluids at temperatures of 300 to 400° F.; however, these polymers have to be employed at very high concentrations in order to generate enough viscosity to suspend proppant. The high polymer concentrations of these fluids make it very difficult to completely degrade at the end of a fracturing operation. Thus, polymer residue within the gas reservoir can block gas flow.

SUMMARY

Accordingly, ongoing needs exist for fracturing fluids that are stable at high temperatures, while reducing polymer residue within subterranean gas formations.

The embodiments of the present disclosure meet these needs by utilizing a high temperature fracturing fluid comprising an aqueous fluid, carboxyl-containing synthetic polymers, metal oxide nanoparticles having a particle size of 0.1 to 500 nanometers; and a metal crosslinker which crosslinks the carboxyl-containing synthetic polymers and the metal oxide nanoparticles to form a crosslinked gel.

The metal oxide nanoparticles, which may include transition metal oxides or rare earth oxides, increase the viscosity of the fracturing fluid, thereby allowing for a reduction in the concentration of polyacrylamide in the fracturing fluid. By reducing the concentration of polyacrylamide in the fracturing fluid, the fracturing fluid leaves less polymer residue, while maintaining its requisite viscosity at high temperatures, for example, 300 to 400° F.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

Figure 1:
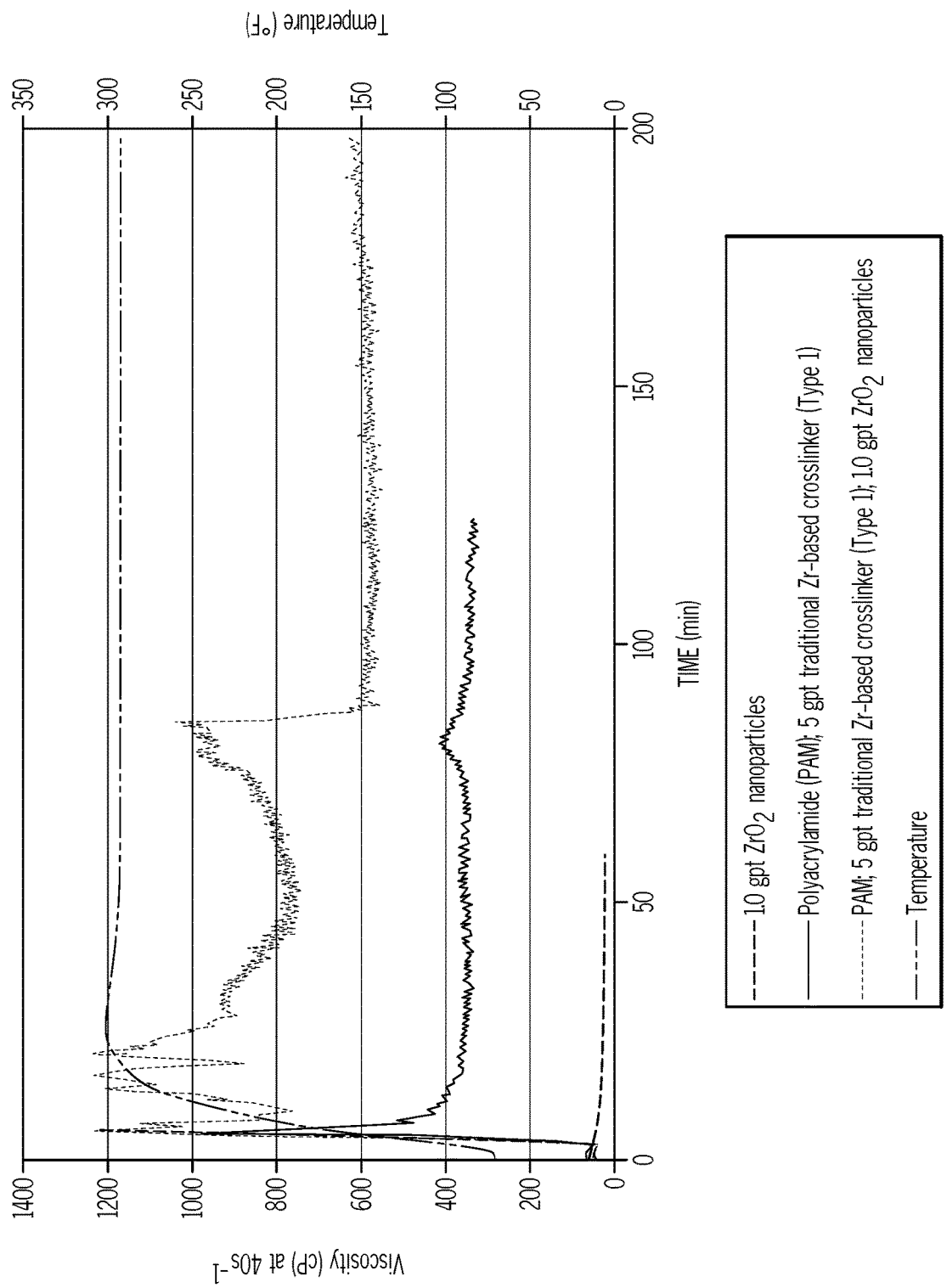
FIG. 1 is a graph of viscosity versus time and temperature for: 1) a fracturing fluid comprising polyacrylamide, Zr-based crosslinker (Type 1), and $ZrO_2$ nanoparticle dispersion; 2) a fracturing fluid comprising polyacrylamide and a Zr-based crosslinker (Type 1), but no $ZrO_2$ nanoparticle dispersion; and 3) $ZrO_2$ nanoparticle dispersion, according to one or more embodiments of the present disclosure.

The embodiments set forth in the drawings are illustrative in nature and not intended to be limiting to the claims. Moreover, individual features of the drawings will be more fully apparent and understood in view of the detailed description.

DETAILED DESCRIPTION

Embodiments of the present disclosure are directed to a fracturing fluid with nanoparticles, wherein the fracturing fluid is suitable to be injected down a wellbore at a rate and applied pressure sufficient for the fracturing fluid to flow into a subterranean formation and to initiate or extend fractures in the formation.

In one or more embodiments, the fracturing fluid may comprise an aqueous fluid, a synthetic polymer (for example, a carboxyl-containing synthetic polymer), a metal crosslinker, and metal oxide nanoparticles. The metal oxide nanoparticles interact with at least a portion of carboxyl-containing synthetic polymer (also called a base fluid) to exhibit an improved stability and viscosity. The metal oxide nanoparticles, when used in fracturing fluids, increase the viscosity to allow better suspension of the proppant in the fracturing fluid. Proper suspension of the proppant holds the subterranean formation open to allow extraction of the gas or oil without any damage to the subterranean formation.

As used herein, "nanoparticles" means particles having an average particle size of 0.1 to 500 nanometers (nm). In one or more embodiments, the nanoparticles may have an average particle size of 1 to 100 nm, or 1 to 80 nm, or 5 to 75 nm, or 10 to 60 nm.

Various metal oxide nanoparticles are contemplated. In one or more embodiments, the metal oxides may comprise one or more transition metal oxides, for example, oxides of transition metals or post-transition metals. For example and not by way of limitation, these transition metal oxides may include one or more of zirconium oxide and titanium oxide. In another embodiment, the metal oxides may comprise rare earth oxides, such as cerium oxide. In a specific embodiment, the metal oxide nanoparticles are zirconium oxide nanoparticles. The metal oxide nanoparticles may be added to the fracturing fluid in various forms, such as in powder form or in a dispersion, for example, an aqueous dispersion. As illustrated in Example 10 as follows, it is desirable in some embodiments to add the metal oxide nanoparticles in a dispersion, because it increases crosslinking with the carboxyl-containing synthetic polymer. Moreover, in further embodiments, the metal oxide nanoparticles may be stabilized with a polymer, a surfactant, or a combination thereof. In a specific embodiment, the metal oxide nanoparticles may be stabilized with a polymer, such as polyvinylpyrrolidone.

Similarly, various carboxyl-containing synthetic polymers are contemplated for the fracturing fluid. As used herein, the carboxyl-containing synthetic polymer includes polymers produced from one or more monomers containing carboxyl groups or derivatives thereof, such as salts or esters of the carboxyl containing monomers (e.g., acrylates).

For example, the carboxyl-containing synthetic polymer may be a polyacrylamide polymer. In one or more embodiments, the polyacrylamide polymer and copolymer may comprise a polyacrylamide copolymer, a polyacrylamide terpolymer, or combinations thereof. The polyacrylamide polymer, whether a copolymer, or terpolymer, may include at least one monomer selected from the group consisting of acrylic acid, or other monomers containing carboxyl groups or their salts or esters such as acrylates, and combinations thereof. Examples of said acrylates include methyl acrylate, ethyl acrylate, n-propyl acrylate, isopropyl acrylate, n-butyl acrylate, isobutyl acrylate, tert-butyl acrylate, n-octyl acrylate, and the like. Other monomers besides the carboxyl-containing monomer may include acrylamide, methacrylamide, N-substituted acrylamides. Further examples of said N-substituted acrylamides include, among others, N-methyl acrylamide, N-propyl acrylamide, N-butyl acrylamide, N,N-dimethyl acrylamide, N-methyl-N-sec-butyl acrylamide. In other embodiments, the carboxyl-containing synthetic polymer may be a partially hydrolyzed carboxyl-containing synthetic polymer. The Examples which follow depict one of many possible suitable examples, a partially hydrolyzed polyacrylamide terpolymer. Various percentages of hydrolysis are contemplated as would be familiar to the skilled person.

As stated above, the fracturing fluid also comprises a metal crosslinker which promotes crosslinking between the carboxyl-containing synthetic polymer to form three-dimensional polymer networks. The metal oxide nanoparticles are dispersed within this three dimension polymer network. Various metal crosslinkers are considered suitable. For example and not by way of limitation, the metal crosslinker is selected from the group consisting of zirconium crosslinkers, titanium crosslinkers, aluminum crosslinkers, chromium crosslinkers, iron crosslinkers, hafnium crosslinkers, antimony cross linkers, other metal crosslinkers, and combinations thereof. The metal crosslinkers may include organic metal oxide complexes.

In one embodiment, the metal crosslinker is a zirconium crosslinker. Examples of zirconium crosslinkers may include a zirconium alkanolamine complex, a zirconium alkanolamine polyol complex. Suitable commercial embodiments of the zirconium crosslinker may include TYZOR® 212 produced by Dorf Ketal Specialty Catalysts LLC.

As stated previously, the metal crosslinker crosslinks the carboxyl-containing synthetic polymers to form a crosslinked gel. Various amounts are contemplated for the crosslinked gel. In one or more embodiments, the fracturing fluid may comprise 1 to 100 pounds per thousand gallons (pptg) of crosslinked gel, or 15 to 50 pptg of crosslinked gel, or 20 to 45 pptg of crosslinked gel.

Additionally, various amounts are contemplated for the individual components of the fracturing fluid. For example and not by way of limitation, the fracturing fluid may include 1 to 60 pptg of the carboxyl-containing synthetic polymer (e.g., polyacrylamide), or from 1 to 50 pptg of the carboxyl-containing synthetic polymer, or 10 from 50 pptg of the carboxyl-containing synthetic polymer, or from 20 to 40 pptg of the carboxyl-containing synthetic polymer. As will be shown further in the Examples, the presence of the metal oxide nanoparticles enables reduction of the carboxyl-containing synthetic polymer by amounts of 5% to 50% by weight.

Moreover, in further embodiments, the fracturing fluid may comprise from 0.0002% to about 2% by weight of the metal oxide nanoparticles, or from 0.002% to 0.5% by weight of metal oxide nanoparticles, or from 0.005% to 0.2% by weight of metal oxide nanoparticles. Additionally, the fracturing fluid includes from about 0.02% to about 2% by weight of the metal crosslinker.

The fracturing fluid also includes additional additives, for example, additives that alter the salt concentration of the crosslinked gel. In one or more embodiments, brine solution may be added, such as KCl or $CaCl_2$.

Optionally, the fracturing fluid may also include additional components such as buffers, antioxidants, biocides, clay stabilizers, diverting agents, fluid loss additives, friction reducers, iron controllers, gel stabilizers, etc. The fracturing fluid may further comprise a surfactant, which may be used to lower the surface tension of the fracturing fluid. Various surfactants are contemplated, for example, anionic surfactants, cationic surfactants, amphoteric surfactants, zwitterionic surfactants, or combinations thereof.

Optionally, the fracturing fluid may also comprise a breaker to degrade the crosslinked gel. The breaker is used to "break" or reduce the viscosity of the fracturing fluid so that the fracturing fluid may be easily recovered from the fracture during clean up. In one or more embodiments, the breaker may be an acid, an oxidizer, an enzyme breaker, a chelating agent, or a combination thereof. Examples of breakers include, but are not limited to sodium bromate, potassium bromate, sodium persulfate, ammonium persulfate, potassium persulfate, and various peroxides. Additionally, an encapsulant may be used to control or delay the release of the breaker encapsulated or disposed therein. In one or more embodiments, the breaker may include a combination of encapsulated and unencapsulated breaker. For example, the breaker may include a combination of sodium bromate and encapsulated sodium bromate.

EXAMPLES

The various embodiments of the present disclosure will be further clarified by the following examples. The examples are illustrative in nature, and should not be understood to limit the subject matter of the present disclosure.

Table 1 as follows lists the components of the fracturing fluids used in the following Examples 1-10.

TABLE 1

| Product Name/Identifier | Composition/Properties | Supplier |
|---|---|---|
| CELB-217-063-2 | Partially hydrolyzed polyacrylamide terpolymer (80% active) | ChemEOR |
| CELB-225-010-2 | Gel stabilizer/antioxidant | ChemEOR |
| DP/EM 5015 | Partially hydrolyzed polyacrylamide terpolymer (30% active) | SNF |
| TYZOR 212 | Zr-based crosslinker (Type 2) | Dorf Ketal Specialty Catalysts LLC |
| $ZrO_2$ nanoparticles dispersion | 45-55 nm; 20 wt % active in water | U.S. Research Nanomaterials, Inc |
| $TiO_2$ nanoparticles dispersion | Rutile structure; 5-15 nm; 15 wt % active in water | U.S. Research Nanomaterials, Inc |
| $CeO_2$ nanoparticles dispersion | 30-50 nm; 20 wt % active in water | U.S. Research Nanomaterials, Inc |
| Tetramethyl ammonium chloride (TMAC) dispersion | Clay stabilizer (50 wt % active) | |
| PABA-152L | Acetic acid/acetate buffer | Precision Additives |
| ProCap BR | Encapsulated sodium bromate breaker | Fritz Industries |

Synthesis Methods for Examples 1-6

The crosslinked gel samples of Examples 1-6 were prepared using a Waring® blender. Referring to Table 1, polyacrylamide-based polymer, (for example, CELB-217-063-2, or DP/EM 5015), which is being used as the base fluid, was hydrated in tap water. Additional additives such as buffers, and antioxidant (CELB-225-010-2) may be added to the base fluid followed by the addition of metal oxide nanoparticles ($ZrO_2$, $TiO_2$ and $CeO_2$) and the Zr-based metal crosslinker (Type 1, containing 5.8 wt. % $ZrO_2$). The samples of Examples 1-6 were generally prepared in a volume of 100 mL. A 52 mL fluid sample was placed into a Grace M5600 HPHT Rheometer equipped with a B5 Bob configuration. Tests were performed using a shear-rate of 40 $s^{-1}$ at the temperature profiles depicted in FIGS. 1-6 respectively.

Example 1

As shown in FIG. 1, a viscosity comparison was performed for: 1) a fracturing fluid comprising 30 pptg polyacrylamide (CELB-217-063-2), 5 gpt Zr-based crosslinker (Type 1, containing 5.8 wt. % $ZrO_2$), and a 1.0 gpt $ZrO_2$ nanoparticle dispersion; 2) a fracturing fluid comprising 30 pptg polyacrylamide (CELB-217-063-2) and 5 gpt Zr-based crosslinker (Type 1, containing 5.8 wt. % $ZrO_2$), but no $ZrO_2$ nanoparticle dispersion; and 3) a fracturing fluid comprising 30 pptg polyacrylamide (CELB-217-063-2), and a 1.0 gpt $ZrO_2$ nanoparticle dispersion (45-55 nm; 20 wt % active), but no Zr-based crosslinker. The viscosity curves of FIG. 1 demonstrate that the combination of the Zr-based crosslinker and the $ZrO_2$ nanoparticle dispersion achieves better viscosity stability than when the polyacrylamide is crosslinked with 5 gpt traditional Zr-based crosslinker (Type 1) alone. Without being bound by theory, the interaction between the $ZrO_2$ nanoparticles and partially hydrolyzed polyacrylamide reinforces the crosslinked gel and provides improved viscosity stability for the crosslinked gel.

Example 2

Figure 2:
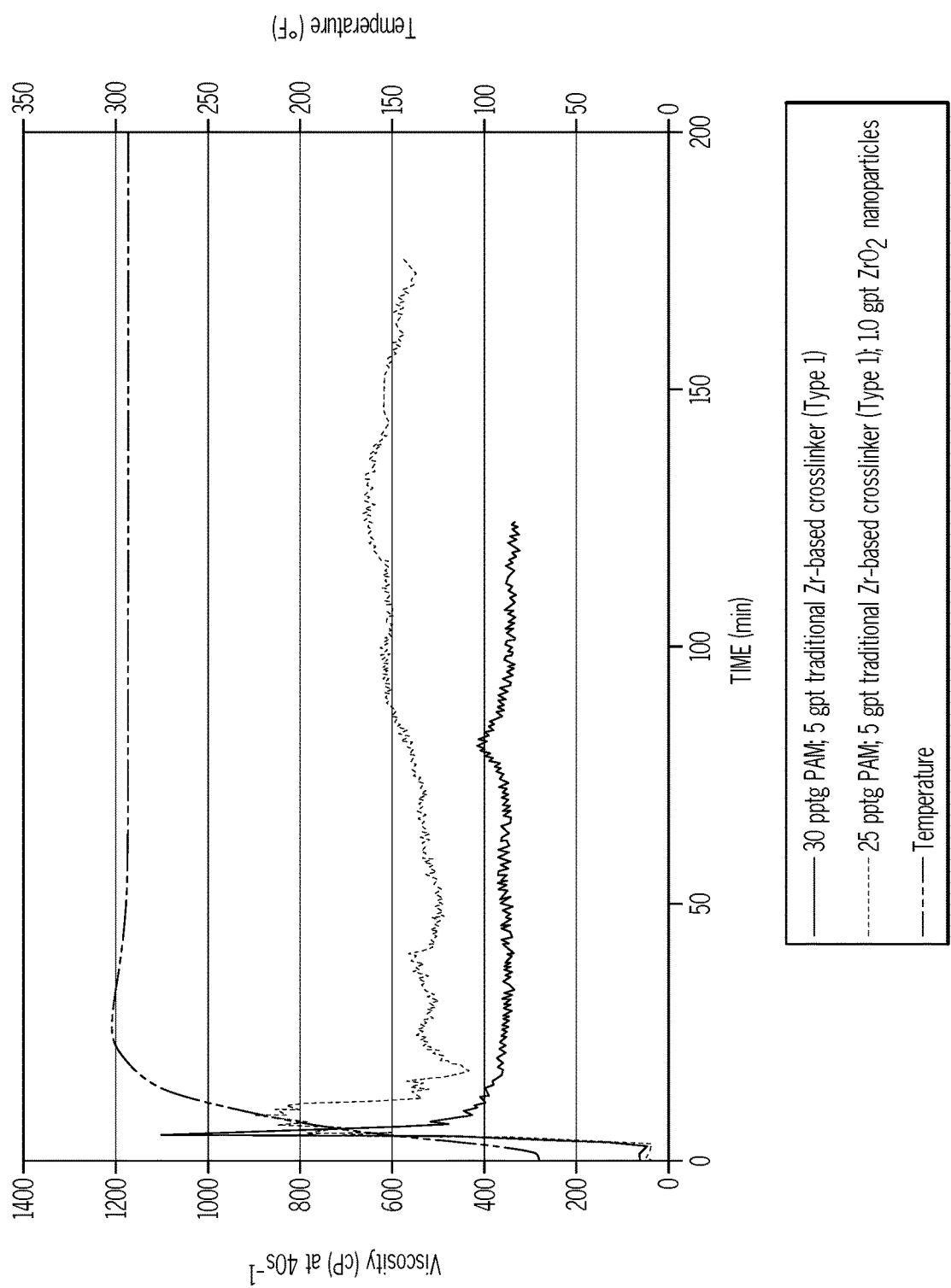
FIG. 2 is another graph of viscosity versus time and temperature for: 1) a fracturing fluid comprising polyacrylamide, Zr-based crosslinker (Type 1), and $ZrO_2$ nanoparticle dispersion; and 2) a fracturing fluid comprising polyacrylamide and a Zr-based crosslinker (Type 1), but no $ZrO_2$ nanoparticle dispersion, according to one or more embodiments of the present disclosure.

As shown in FIG. 2, another viscosity comparison was performed for: 1) a fracturing fluid comprising 25 pptg polyacrylamide (CELB-217-063-2), 5 gpt Zr-based crosslinker (Type 1, containing 5.8 wt. % $ZrO_2$), and 1.0 gpt $ZrO_2$ nanoparticle dispersion (45-55 nm; 20 wt % active); and 2) a fracturing fluid comprising 30 pptg polyacrylamide (CELB-217-063-2) and 5 gpt Zr-based crosslinker (Type 1, containing 5.8 wt. % $ZrO_2$), but no $ZrO_2$ nanoparticles. As shown, the addition of the $ZrO_2$ metal oxide nanoparticles enables reduction of the polymer loading by 5 pptg (a 17% loading reduction), while increasing and stabilizing the viscosity.

Example 3

Figure 3:
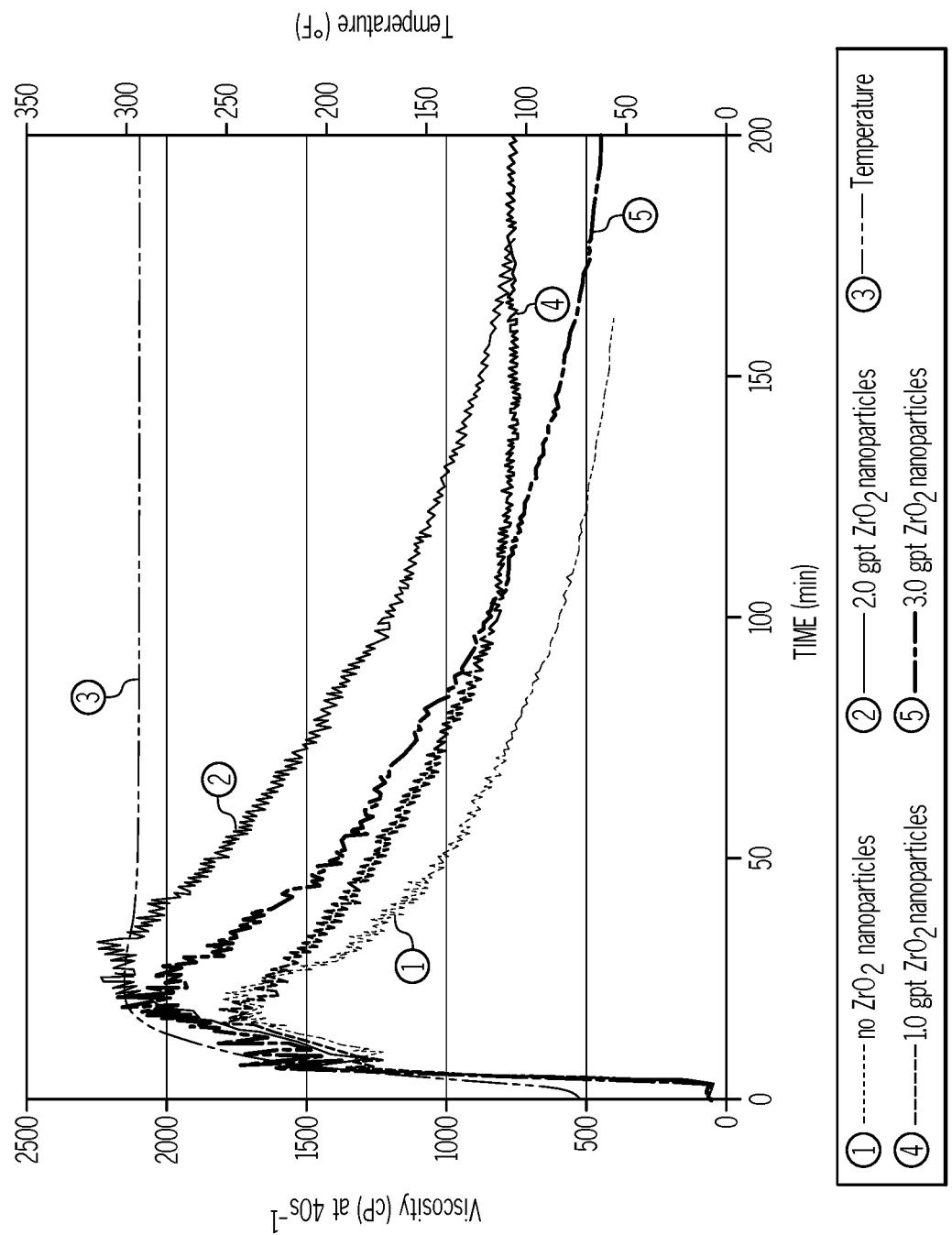
FIG. 3 is a graph of viscosity versus time and temperature comparing fracturing fluids with varying amounts of $ZrO_2$ nanoparticle dispersions, according to one or more embodiments of the present disclosure.

As shown in FIG. 3, a viscosity comparison was performed at 300° F. for various fracturing fluids comprising 30 pptg polyacrylamide (DP/EM 5015) crosslinked with 5 gpt Zr-based crosslinker and $ZrO_2$ nanoparticle dispersion (45-55 nm; 20 wt % active) at multiple concentrations. Specifically, three samples with the following amounts of $ZrO_2$ nanoparticles were tested: 1.0 gpt, 2.0 gpt and 3.0 gpt. All three tests performed better than the control sample, which does not include $ZrO_2$ nanoparticles, thereby indicating that the addition of metal oxide nanoparticles help in stabilizing the viscosity of the fracturing fluid at high temperatures. Surprisingly, the crosslinked gel with addition of 2.0 gpt of $ZrO_2$ nanoparticles performed the best and remained above 800 cP at the shear rate of 40 $s^{-1}$ for more than 180 min at 300° F.

Example 4

Figure 4:
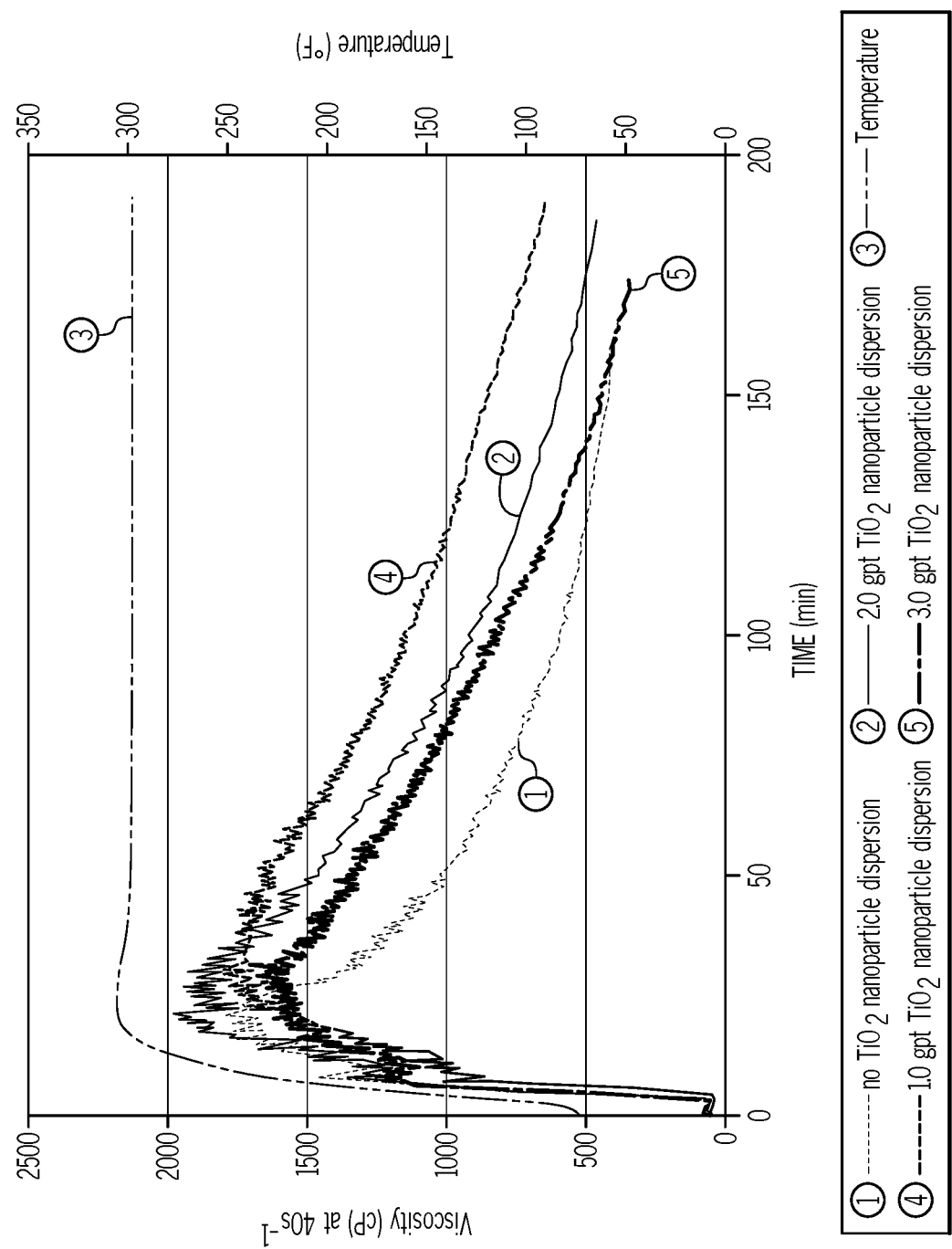
FIG. 4 is a graph of viscosity versus time and temperature comparing fracturing fluids with varying amounts of $TiO_2$ nanoparticle dispersions, according to one or more embodiments of the present disclosure.

As shown in FIG. 4, a viscosity comparison was performed at 300° F. for various fracturing fluids comprising 30 pptg polyacrylamide (DP/EM 5015) crosslinked with 5 gpt Zr-based crosslinker (Type 1) and a $TiO_2$ nanoparticle dispersion (Rutile; 5-15 nm; 15 wt % active in a dispersion form) at multiple concentrations. Specifically, three samples with the following amounts of $TiO_2$ nanoparticles were tested: 1.0 gpt, 2.0 gpt and 3.0 gpt. Similar to the Example 3 samples with $ZrO_2$ nanoparticles, all three samples with $TiO_2$ nanoparticles performed better than the control sample, which does not include $TiO_2$ nanoparticles. Surprisingly, the crosslinked gel with the addition of 1.0 gpt of $TiO_2$ nanoparticles performed the best and remained above 650 cP at the shear rate of 40 $s^{-1}$ for more than 180 min at 300° F.

Example 5

Figure 5:
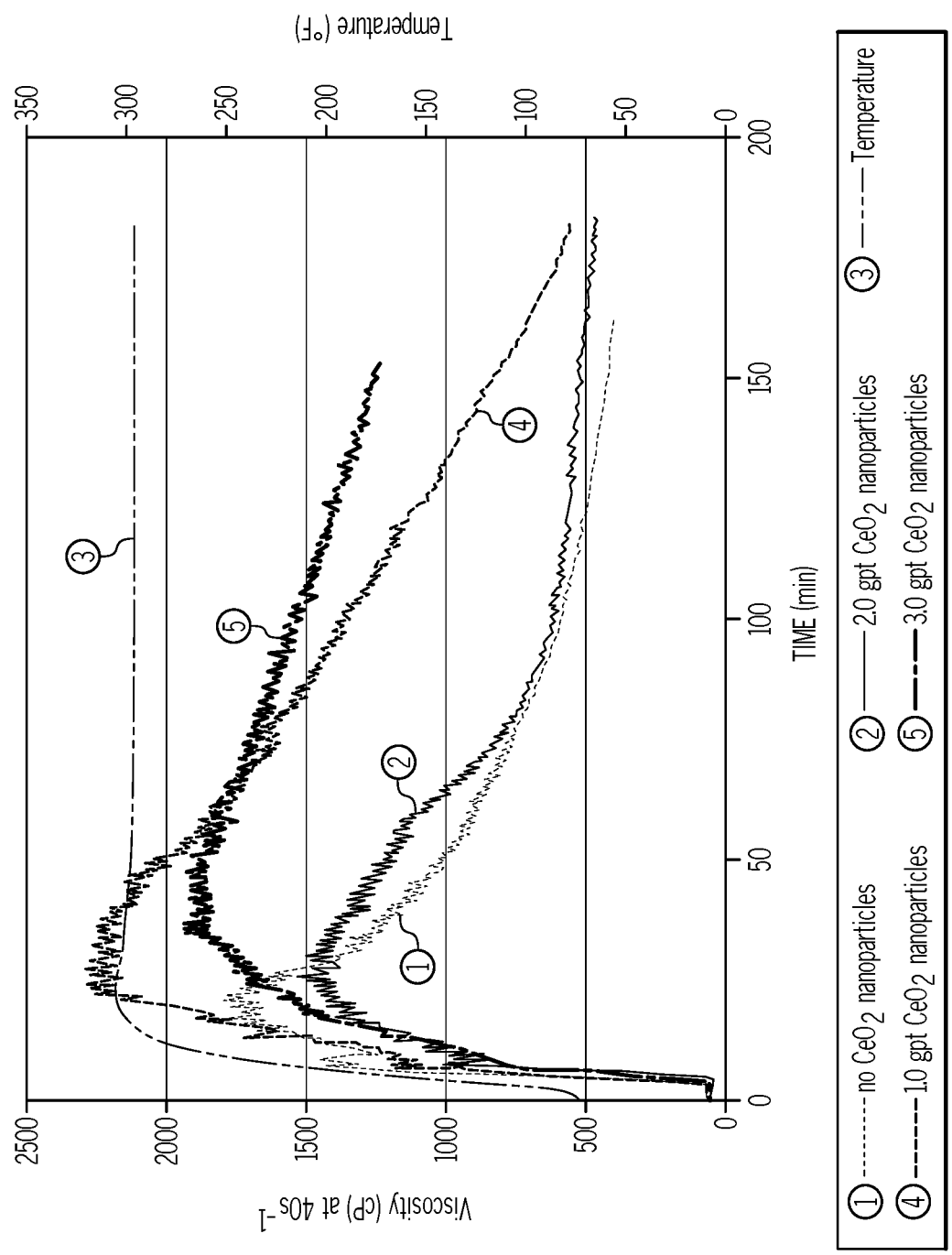
FIG. 5 is a graph of viscosity versus time and temperature comparing fracturing fluids with varying amounts of $CeO_2$ nanoparticle dispersions, according to one or more embodiments of the present disclosure.

As shown in FIG. 5, a viscosity comparison was performed at 300° F. for various fracturing fluids comprising 30 pptg polyacrylamide (DP/EM 5015) crosslinked with 5 gpt Zr-based crosslinker (Type 1) and CeO2 nanoparticle dispersion (30-50 nm; 20 wt % active in a dispersion form) at multiple concentrations. Specifically, three samples with the following amounts of CeO2 nanoparticles were tested: 1.0 gpt, 2.0 gpt and 3.0 gpt. The crosslinked gel with the addition of 3.0 gpt of CeO2 nanoparticles performed the best and remained above 1250 cP at the shear rate of 40 s-1 for more than 150 min at 300° F.

Example 6

Figure 6:
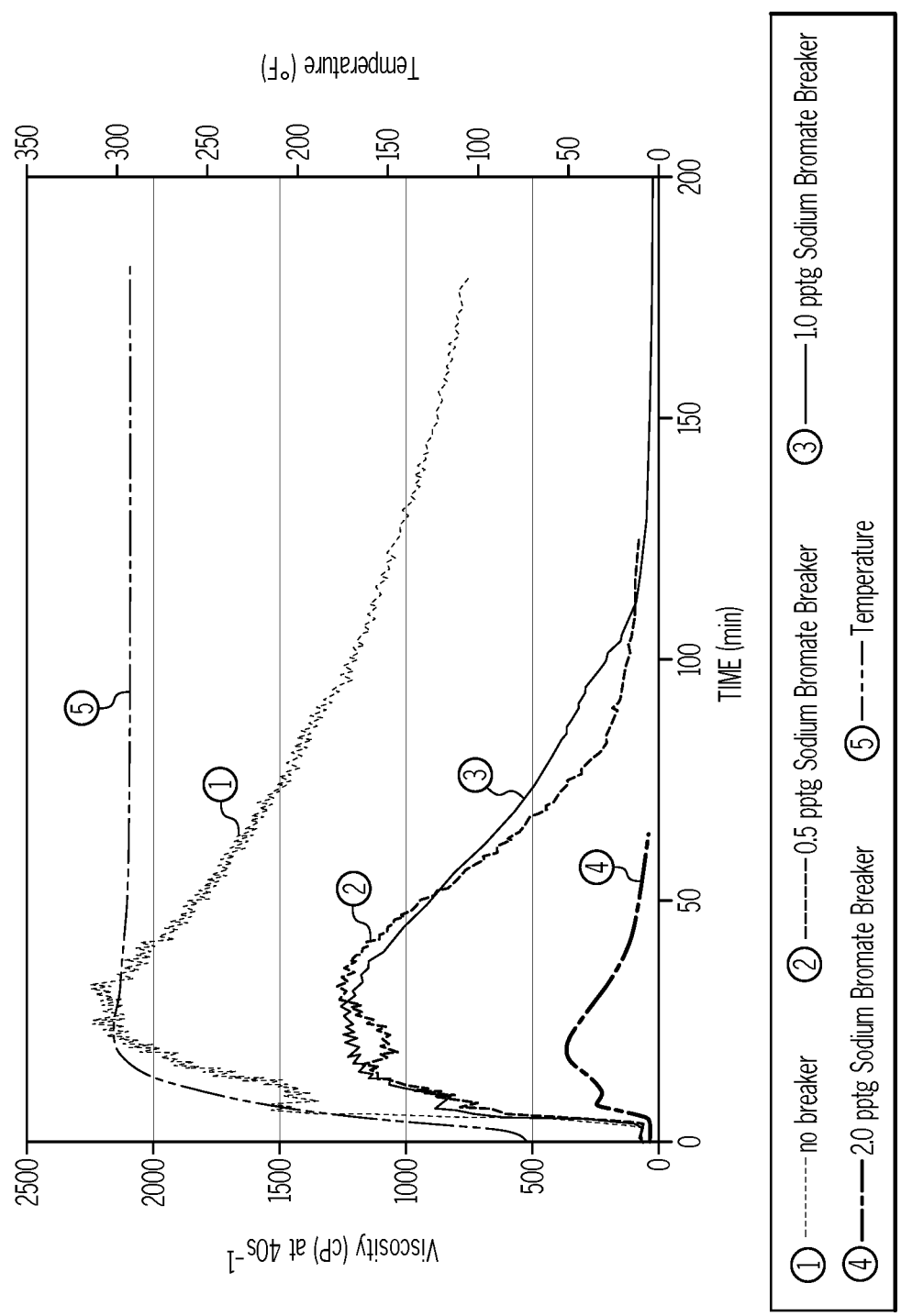
FIG. 6 is a graph of viscosity versus time and temperature comparing fracturing fluids with varying amounts of sodium bromate breaker added, according to one or more embodiments of the present disclosure.

As stated previously, an oxidizer type breaker fluid was added separately after the fracturing process to eliminate the polymer residue from the fracture. Referring to FIG. 6, a viscosity comparison was performed at 300° F. for various fracturing fluids having various concentrations of sodium bromate as a breaker. Each crosslinked gel sample included 30 pptg polyacrylamide (DP/EM 5015), 5 gpt Zr-based crosslinker (Type 1), and 2.0 gpt ZrO2 nanoparticle dispersion; however, the samples differ in including the following amounts of sodium bromate breaker: zero breaker; 0.5 pptg sodium bromate; 1.0 pptg sodium bromate; and 2.0 pptg sodium bromate. As shown, the lowest concentration sodium bromate sample, 0.5 pptg, was sufficient to break the crosslinked fracturing fluid.

Synthesis Methods for Examples 7-9

The samples of Examples 7-9 were formulated in accordance with the following procedure. The water analysis for this field water is in Table 2 as follows. The crosslinked gel includes 30 pptg polyacrylamide (DP/EM 5015), which was prepared by hydrating 12 grams of DP/EM 5015 in 1 liter of water at 1000 rpm for 30 min. Two water sources have been tested in this strategy, Houston tap water or synthetic field water from one of the Saudi Aramco wells as listed in Table 2. Fluid samples were prepared using a Waring® blender. The fracturing fluid was prepared by taking 100 mL of base fluid, followed by addition of pH adjusting agent, gel stabilizers, nanomaterials, and then Zr-based crosslinker (Type 2). In Table 2 below, the analyzed field water source from Saudi Arabia had total dissolved solids (TDS) amount of about 850 ppm.

TABLE 2

| Ion | Concentration (mg/L) |
|---|---|
| Sulfate | 126 |
| Cl | 461 |
| $HCO_3^-$ | 231 |
| $CO_3^{2-}$ | 12 |
| Ca | 0.6 |
| Mg | 1.1 |
| Fe | 3.22 |

Example 7

Figure 7:
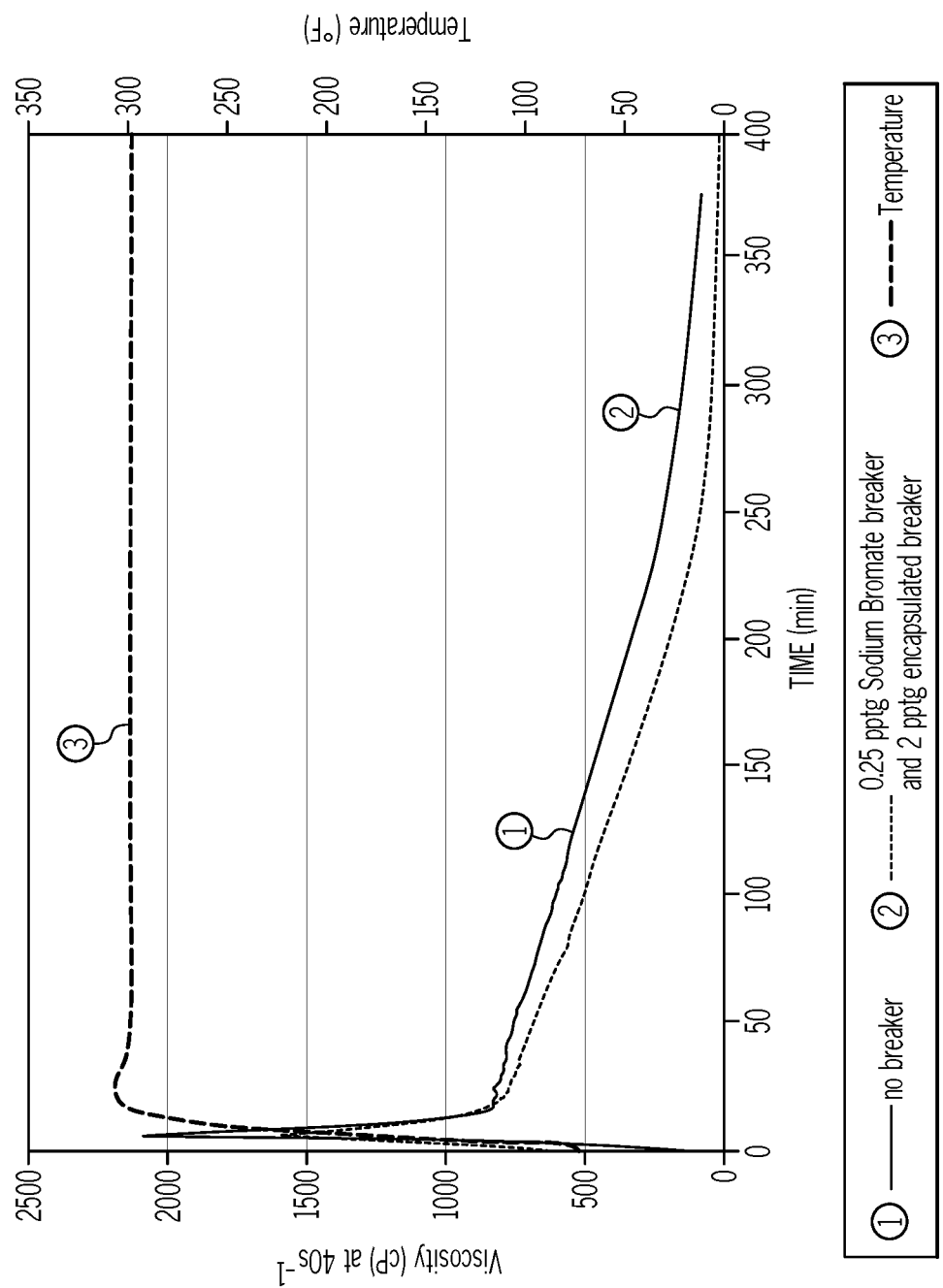
FIG. 7 is a graph of viscosity versus time and temperature comparing a fracturing fluid comprising a combination of encapsulated breaker and unencapsulated sodium bromate breaker versus a fracturing fluid without breaker added, according to one or more embodiments of the present disclosure.

FIG. 7 depicts the effect on viscosity at a temperature of 300° F. when using the combination of an unencapsulated breaker and an encapsulated breaker. As shown, the breaker containing fracturing fluid and the comparative breaker-free fracturing fluid comprises 30 pptg DP/EM 5015 (hydrated in Synthetic field water), 1.8 gpt 20% acetic acid, 1.0 gpt CELB-225-010-2, 2.0 gpt TMAC, 1.0 gpt $ZrO_2$ nanoparticle solution, and 0.5 gpt Zr-based crosslinker (Type 2). The pH of the fluid is about 5.3. Additionally, the breaker containing fluid includes 0.25 pptg sodium bromate and 2 pptg ProCap BR. As shown, when no breaker is utilized, there is still some viscosity remaining, which correlates with polyacrylamide residue buildup.

Example 8

Figure 8:
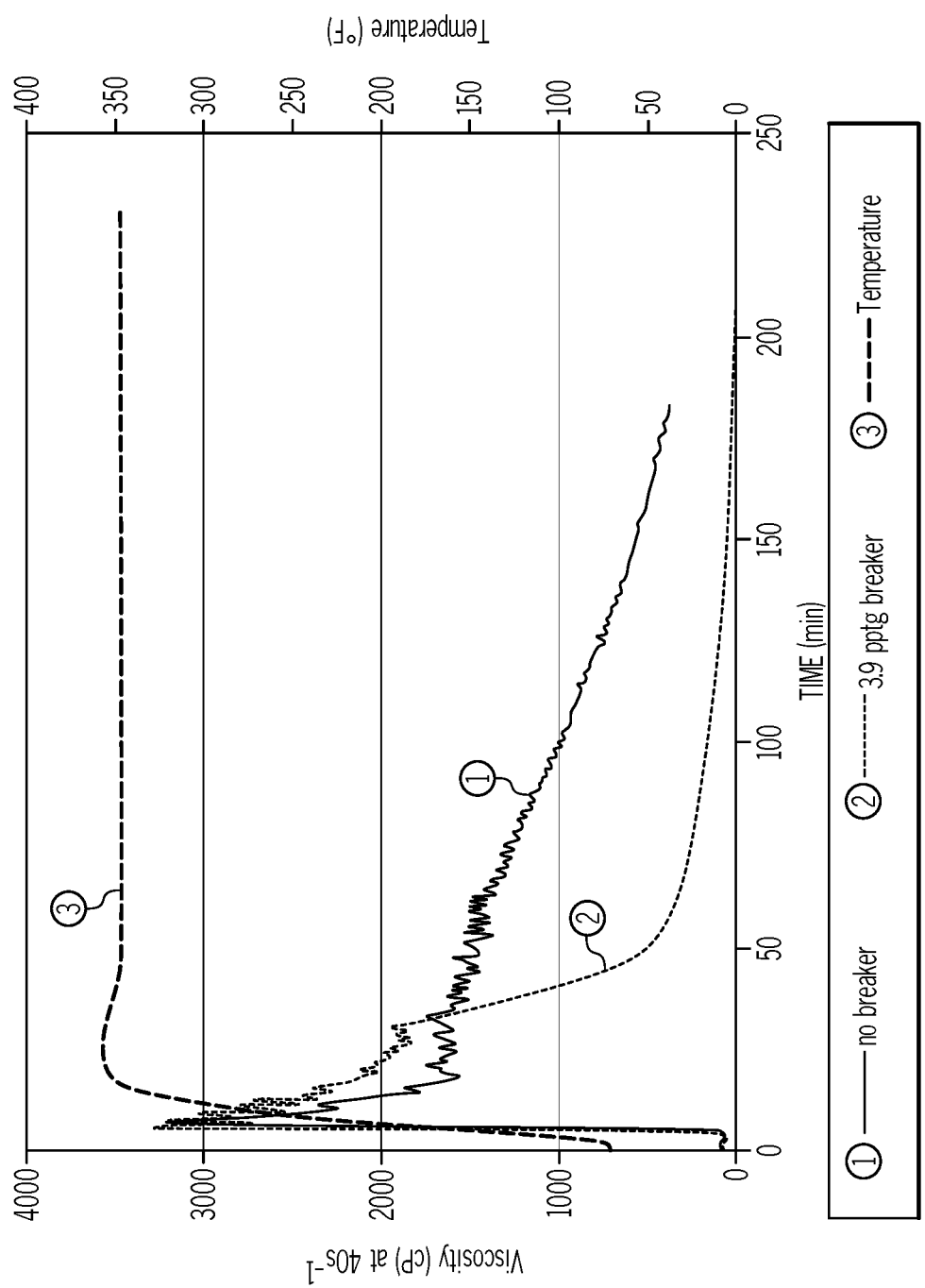
FIG. 8 is a graph of viscosity versus time and temperature comparing fracturing fluids with and without sodium bromate breaker added, according to one or more embodiments of the present disclosure.

FIG. 8 depicts the effect on viscosity at a temperature of 350° F. when using an encapsulated breaker. As shown, the breaker containing fracturing fluid and the comparative breaker-free fracturing fluid includes 30 pptg DP/EM 5015 1.8 gpt 20% acetic acid, 2.0 gpt CELB-225-010-2, 2.0 gpt 50% TMAC, 1.0 gpt $ZrO_2$ nanoparticle solution, and 0.9 gpt Zr-based crosslinker (Type 2) (pH-5.4). The breaker containing fracturing fluid included 3.9 pptg ProCap BR encapsulated breaker. Similar to Example 7, when no breaker is utilized as shown in FIG. 8, there is still some viscosity remaining, whereas the breaker reduces the viscosity to essentially zero Example 9

Figure 9:
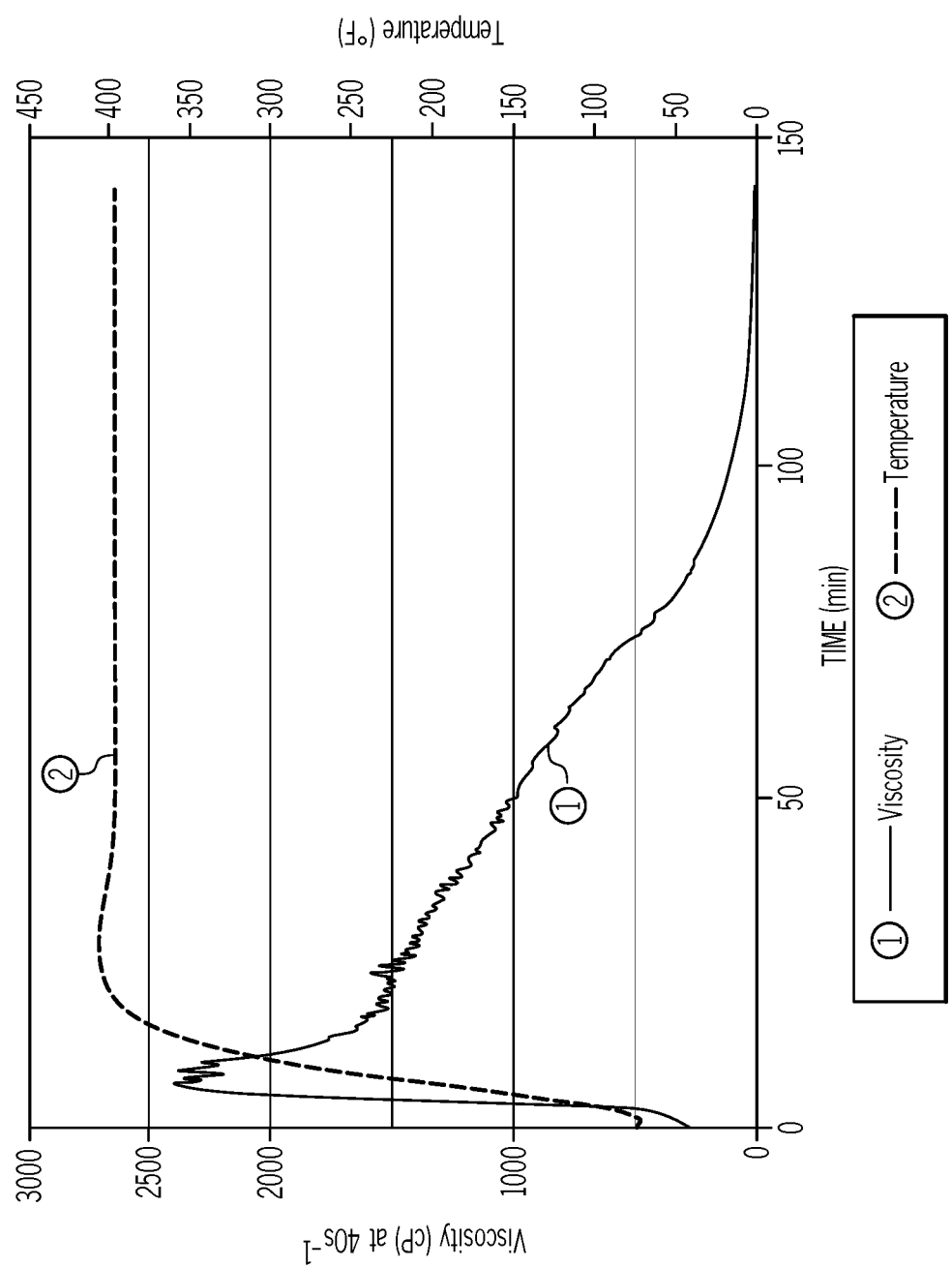
FIG. 9 is a graph of viscosity versus time and temperature for a sample fracturing fluid with $ZrO_2$ nanoparticle dispersion, according to one or more embodiments of the present disclosure.

FIG. 9 depicts the stabilizing effect on viscosity at a temperature of 400° F. when using $ZrO_2$ nanoparticles. As shown, the fracturing fluid, which includes 30 pptg DP/EM 5015 (hydrated in Synthetic field water), 1.8 gpt 20% acetic acid, 3.0 gpt CELB-225-010-2, 2.0 gpt 50% TMAC, 1.0 gpt $ZrO_2$ nanoparticle solution, and 0.9 gpt Zr-based crosslinker (Type 2) (pH~5.4), maintains a viscosity above 500 cP at a shear rate of 40 $s^{-1}$ for about 75 min.

Example 10

Figure 10:
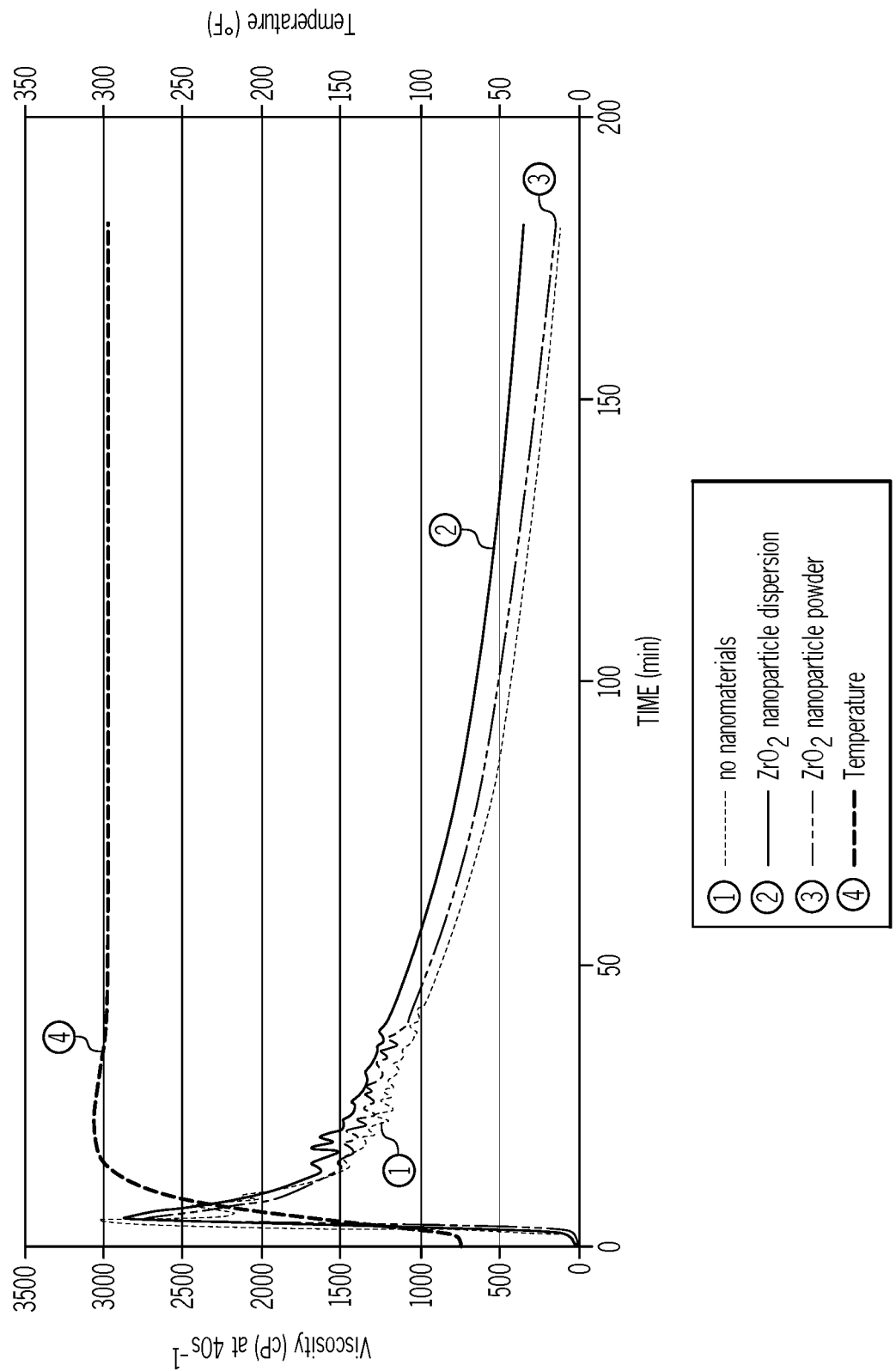
FIG. 10 is a graph of viscosity versus time and temperature comparing fracturing fluids with nanoparticles in powder form or dispersion form, according to one or more embodiments of the present disclosure.

As shown in FIG. 10, a viscosity comparison was performed at 300° F. for fracturing fluids comprising $ZrO_2$ nanoparticles in powder or dispersion form. The fracturing fluid samples comprise the following component mixtures:

No nanomaterials: 100 mL 25# DP/EM 5015 in Tap Water, 0.37 mL PABA-152L (acetic acid/acetate buffer), 0.05 mL CELB 225-010-2, 0.2 mL 50% TMAC, and 0.06 mL Zr-based crosslinker (Type 2). The fluid mixture has a final pH of approximately 5.12.

$ZrO_2$ nanodispersion: 100 mL 25# DP/EM 5015 in Tap Water, 0.1 mL ZrO2 nanoparticles (45-55 nm; 20% dispersion; contains 20 mg of nanoparticles), 0.37 mL PABA-152L (acetic acid/acetate buffer), 0.05 mL CELB 225-010-2, 0.2 mL 50% TMAC, and 0.06 mL Zr-based crosslinker (Type 2). The fluid mixture has a final pH of approximately 5.30.

$ZrO_2$ powder: 100 mL 25# DP/EM 5015 in Tap Water, 40 mg ZrO2 nanoparticles (powder; high purity, 99.95%), 0.37 mL PABA-152L (acetic acid/acetate buffer), 0.05 mL CELB 225-010-2, 0.2 mL 50% TMAC, and 0.06 mL Zr-based crosslinker (Type 2). The fluid mixture has a final pH of approximately 5.32.

Referring to FIG. 10, the addition of 20 mg of $ZrO_2$ nanoparticles in dispersion form maintains the viscosity above 500 cP at a shear rate of 40 $s^{-1}$ for 130 mins, which is a 50% increase compared to the fluid without nanoparticles. Moreover, even with addition of double amount of the $ZrO_2$ nanoparticle powder, the viscosity improvement (500 cp at 40 $s^{-1}$ for 99 min) is less than the viscosity improvement achieved by the samples with 20 mg of $ZrO_2$ nanoparticles in a dispersion form.

It should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A fracturing fluid comprising:
    an aqueous fluid;
    carboxyl-containing synthetic polymers;
    metal oxide nanoparticles having a particle size of 0.1 to 500 nanometers; and
    a metal crosslinker which crosslinks the carboxyl-containing synthetic polymers to form a crosslinked gel, wherein:
        the metal oxide nanoparticles are dispersed within the crosslinked gel,
        the fracturing fluid comprises 1 to 100 pptg crosslinked gel, 1 to 100 pptg polyacrylamide, 1 to 3 gpt metal oxide nanoparticle dispersion, and 3 to 10 gpt metal crosslinker, and
        the metal oxide nanoparticles consist of metal.

2. The fracturing fluid of claim 1, wherein the carboxyl-containing synthetic polymers comprise an acrylamide-based polymer.

3. The fracturing fluid of claim 2, wherein the acrylamide-based polymer comprises a polyacrylamide copolymer, a polyacrylamide terpolymer, a polyacrylamide tetrapolymer, or combinations thereof.

4. The fracturing fluid of claim 2, wherein the acrylamide-based polymer includes at least one monomer selected from the group consisting of acrylic acid, and acrylic acid derivatives.

5. The fracturing fluid of claim 1, wherein the fracturing fluid comprises from 0.0002% to 2% by weight of metal oxide nanoparticles.

6. The fracturing fluid of claim 1, wherein the metal crosslinker is selected from the group consisting of zirconium crosslinkers, titanium crosslinkers, aluminum crosslinkers, iron crosslinkers, hafnium crosslinkers, antimony cross linkers, and combinations thereof.

7. The fracturing fluid of claim 1, wherein the fracturing fluid comprises from 0.02% to 2% by weight of metal crosslinker.

8. The fracturing fluid of claim 1, wherein the fracturing fluid comprises from 1 to 60 pptg of carboxyl-containing synthetic polymer.

9. The fracturing fluid of claim 1, wherein the fracturing fluid comprises one or more additives, wherein the additives are selected from the group consisting of buffers, antioxidants, biocides, clay stabilizers, diverting agents, fluid loss additives, friction reducers, iron controllers, gel stabilizers, surfactants, and combinations thereof.

10. The fracturing fluid of claim 1, wherein the fracturing fluid comprises 1 to 100 pptg of crosslinked gel.

11. The fracturing fluid of claim 1, further comprising a viscosity breaker to degrade the crosslinked gel.

12. The fracturing fluid of claim 11, wherein the viscosity breaker is encapsulated for controlled release of the viscosity breaker.

13. The fracturing fluid of claim 1, wherein the metal oxides of the metal oxide nanoparticles are selected from the group consisting of zirconium oxide, cerium oxide, titanium oxide, and combinations thereof.

14. The fracturing fluid of claim 1, wherein the metal oxide nanoparticles are zirconium oxide nanoparticles, and the metal crosslinker is a zirconium crosslinker.

15. The fracturing fluid of claim 1, further comprising brine solution.

16. The fracturing fluid of claim 1, wherein the metal oxide nanoparticles comprise transition metal oxides, rare earth metal oxides or combinations thereof.

17. The fracturing fluid of claim 1, wherein the metal oxide nanoparticles are in a metal oxide nanoparticle dispersion.

18. The fracturing fluid of claim 1, wherein the fracturing fluid has a viscosity of greater than 450 cP measured at 300° F.

19. A fracturing fluid comprising:
    an aqueous fluid;
    carboxyl-containing synthetic polymers;
    a 1 to 3 gpt metal oxide nanoparticle dispersion in which the nanoparticles have a particle size from 0.1 to 500 nanometers;
    a viscosity of greater than 450 cP measured at 300° F.; and
    a metal crosslinker which crosslinks the carboxyl-containing synthetic polymers to form a crosslinked gel, wherein:
        the metal crosslinker is selected from the group consisting of zirconium crosslinkers, titanium crosslinkers, aluminum crosslinkers, iron crosslinkers, hafnium crosslinkers, antimony cross linkers, and combinations thereof,
        the metal oxide nanoparticles are dispersed within the crosslinked gel,
        the fracturing fluid comprises 1 to 100 pptg crosslinked gel, 1 to 100 pptg polyacrylamide, and 3 to 10 gpt metal crosslinker, and
        the metal oxide nanoparticles consist of metal oxide.

20. The fracturing fluid of claim 19, wherein a metal oxide of the metal oxide nanoparticles is selected from the group consisting of zirconium oxide, cerium oxide, titanium oxide, and combinations thereof.

21. The fracturing fluid of claim 19, wherein the metal oxide nanoparticles are cerium oxide nanoparticles, and the metal crosslinker is a zirconium crosslinker.

22. The fracturing fluid of claim 19, wherein the metal oxide nanoparticles are titanium oxide nanoparticles, and the metal crosslinker is a zirconium crosslinker.

* * * * *

UNITED STATES PATENT AND TRADEMARK OFFICE
CERTIFICATE OF CORRECTION

PATENT NO. : 10,550,314 B2
APPLICATION NO. : 15/157999
DATED : February 4, 2020
INVENTOR(S) : Feng Liang, Ghaithan Al-Muntasheri and Leiming Li It is certified that error appears in the above-identified patent and that said Letters Patent is hereby corrected as shown below:

On the Title Page

Item (74), attorney, agent, or firm, delete "Dinsmore & Shohl" and insert --Dinsmore & Shohl LLP--, therefor.

Item (56), other publications, cite no: 1, delete "Barati et al., "A Review of Fracturing Fluid Systems Used for Hydraulic Fracturing of Oil and Gas Wells", Jounral of Applied Polymer Science, 2014, 1-11, 40735, Wiley Periodicals, Inc." and insert --Barati et al., "A Review of Fracturing Fluid Systems Used for Hydraulic Fracturing of Oil and Gas Wells", Journal of Applied Polymer Science, 2014, 1-11, 40735, Wiley Periodicals, Inc.--, therefor.

Signed and Sealed this
Second Day of June, 2020

Andrei Iancu
*Director of the United States Patent and Trademark Office*